(12) United States Patent
Ishida et al.

(10) Patent No.: US 12,311,639 B2
(45) Date of Patent: May 27, 2025

(54) INTERLAYER FILM FOR LAMINATED GLASS, AND LAMINATED GLASS

(71) Applicant: SEKISUI CHEMICAL CO., LTD., Osaka (JP)

(72) Inventors: Jun Ishida, Shiga (JP); Hiromitsu Nishino, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 441 days.

(21) Appl. No.: 17/922,672

(22) PCT Filed: Jun. 23, 2021

(86) PCT No.: PCT/JP2021/023737
§ 371 (c)(1),
(2) Date: Nov. 1, 2022

(87) PCT Pub. No.: WO2021/261507
PCT Pub. Date: Dec. 30, 2021

(65) Prior Publication Data
US 2023/0264456 A1     Aug. 24, 2023

(30) Foreign Application Priority Data
Jun. 25, 2020   (JP) ................... 2020-109395

(51) Int. Cl.
    *B32B 17/10*      (2006.01)
(52) U.S. Cl.
    CPC .... *B32B 17/1066* (2013.01); *B32B 17/10036* (2013.01); *B32B 17/10761* (2013.01); *B32B 2250/03* (2013.01); *B32B 2307/412* (2013.01)
(58) Field of Classification Search
    CPC ........ B32B 17/10339; B32B 17/10348; B32B 17/10357; B32B 17/1055;
(Continued)

(56) References Cited

U.S. PATENT DOCUMENTS

| | | | |
|---|---|---|---|
| 10,307,998 B2 | 6/2019 | Nakayama et al. | |
| 2004/0160688 A1 | 8/2004 | Noguchi et al. | |

(Continued)

FOREIGN PATENT DOCUMENTS

| | | |
|---|---|---|
| TW | 201736126 | 10/2017 |
| TW | 201840421 | 11/2018 |

(Continued)

OTHER PUBLICATIONS

International Search Report (ISR) issued Sep. 7, 2021 in International (PCT) Application No. PCT/JP2021/023737.

(Continued)

*Primary Examiner* — Zachary M Davis
(74) *Attorney, Agent, or Firm* — Wenderoth, Lind & Ponack, L.L.P.

(57) ABSTRACT

Provided is an interlayer film for laminated glass capable of suppressing color migration. In an interlayer film for laminated glass according to the present invention, when the interlayer film is arranged between two sheets of clear glass conforming to JIS R3202:1996 to obtain a laminated glass X, and parallel light transmittance is measured for the obtained laminated glass X, the interlayer film has a colored region with a parallel light transmittance of less than 60%, and a transparent region with a parallel light transmittance of 60% or more, the interlayer film has an average thickness in the colored region smaller than an average thickness in the transparent region, and the interlayer film has an absolute value of difference between the average thickness in the colored region and the average thickness in the transparent region of 10 μm or more.

5 Claims, 2 Drawing Sheets

(58) Field of Classification Search
CPC ........ B32B 17/10559; B32B 17/10568; B32B 17/10651; B32B 17/1066
See application file for complete search history.

(56) References Cited

U.S. PATENT DOCUMENTS

| | | |
|---|---|---|
| 2006/0250711 A1 | 11/2006 | Noguchi et al. |
| 2019/0022982 A1 | 1/2019 | Hirota |
| 2020/0016871 A1 | 1/2020 | Ishida et al. |
| 2020/0114735 A1 | 4/2020 | Tao et al. |
| 2020/0156353 A1 | 5/2020 | Yoshida et al. |
| 2021/0213711 A1 | 7/2021 | Nakayama et al. |

FOREIGN PATENT DOCUMENTS

| | | |
|---|---|---|
| WO | 03/059837 | 7/2003 |
| WO | 2017/126468 | 7/2017 |
| WO | 2019/022007 | 1/2019 |
| WO | 2020/040114 | 2/2020 |

OTHER PUBLICATIONS

Extended European Search Report issued Jun. 3, 2024 in European Patent Application No. 21828861.1.

English language translation of International Preliminary Report on Patentability issued Dec. 13, 2022 in corresponding International (PCT) Patent Application No. PCT/JP2021/023737.

[FIG. 1]
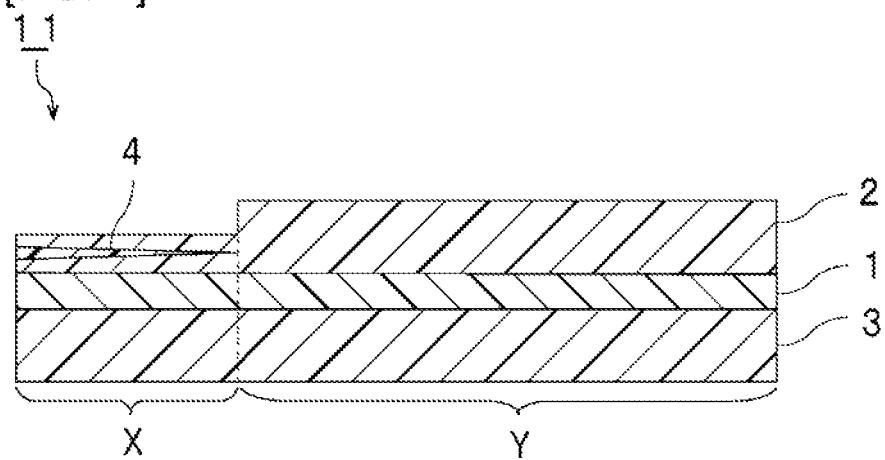
[FIG. 2]
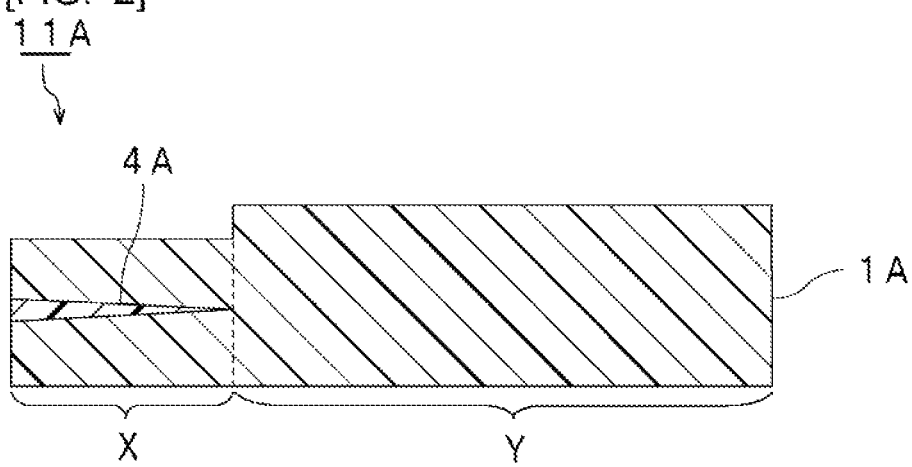
[FIG. 3]
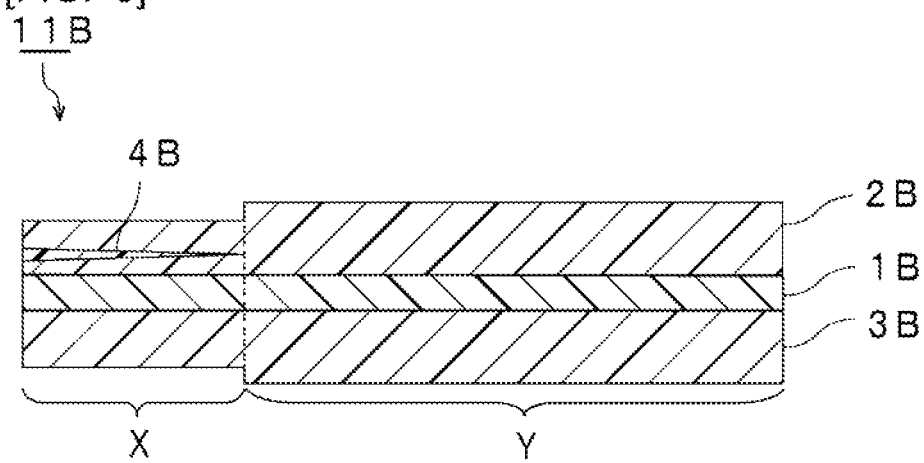

[FIG. 4]
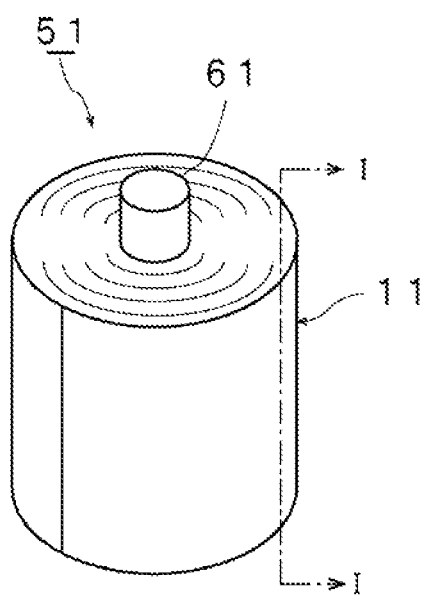
(a)
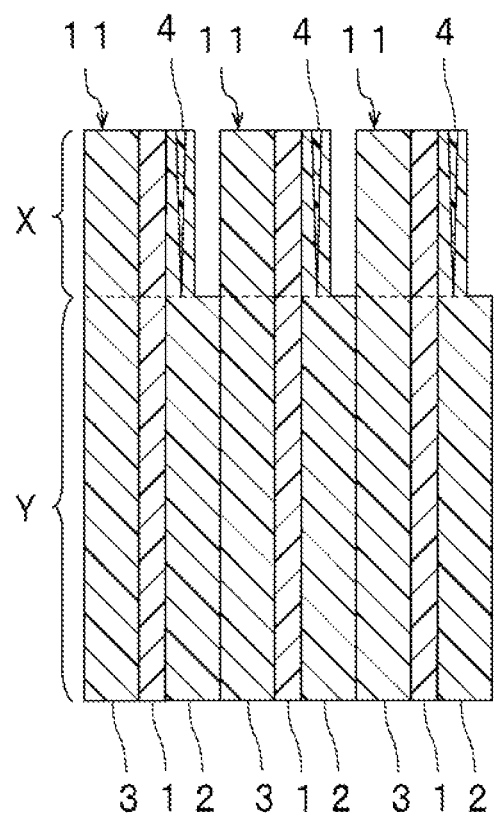
(b)

INTERLAYER FILM FOR LAMINATED GLASS, AND LAMINATED GLASS

TECHNICAL FIELD

The present invention relates to an interlayer film for laminated glass that is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates.

In recent years, laminated glass having designability, light shielding property, or privacy protectability and the like is demanded as laminated glass for buildings or automobiles. Laminated glass having designability, light shielding property, or privacy protectability and the like can be obtained by using an interlayer film containing a coloring agent such as a dye or a pigment and the like.

Patent Document 1 discloses a laminated glass for vehicle in which two glass plates are adhered to each other with an interlayer film interposed therebetween. The interlayer film includes a first region imparted with a light dimming function that causes loss of transmittance for visible light, and a second region surrounded by the first region, or a second region formed by partially recessing an end part of the first region. In the second region, the interlayer film has a loss of transmittance that is smaller than the aforementioned loss of transmittance for visible light. The first region may contain, for example, a pigment or a dye. The first region may be a belt-shaped shading region.

RELATED ART DOCUMENT

Patent Document

Patent Document 1: WO2003/059837A1

SUMMARY OF THE INVENTION

Problems to be Solved by the Invention

An interlayer film provided with a colored layer containing a coloring agent is known. The colored layer is sometimes provided as a surface layer of the interlayer film, and is sometimes provided as an intermediate layer embedded in the interlayer film. The interlayer film provided with a colored layer generally has a colored region corresponding to the position of the colored layer.

Also, the interlayer film is sometimes stored in the condition that the interlayer film is overlapped, for example, in a state of a roll body prepared by winding the interlayer film around an outer periphery of a winding core.

In a conventional interlayer film having a colored region, the colored region comes into contact with other part, and color migration can occur in the contact part when the interlayer film is stored in an overlapped condition. The color migration can occur even in an interlayer film in which a colored layer is embedded inside.

It is an object of the present invention to provide an interlayer film for laminated glass capable of suppressing color migration. It is also an object of the present invention to provide a laminated glass prepared with the interlayer film for laminated glass.

Means for Solving the Problems

According to a broad aspect of the present invention, there is provided an interlayer film for laminated glass (hereinafter, sometimes described as interlayer film), when the interlayer film being arranged between two sheets of clear glass conforming to JIS R3202:1996 to obtain a laminated glass X, and parallel light transmittance being measured for the obtained laminated glass X, the interlayer film having a colored region with a parallel light transmittance of less than 60%, and a transparent region with a parallel light transmittance of 60% or more, the interlayer film having an average thickness in the colored region smaller than an average thickness in the transparent region, and the interlayer film having an absolute value of difference between the average thickness in the colored region and the average thickness in the transparent region of 10 µm or more.

In a specific aspect of the interlayer film according to the present invention, the colored region has a colored layer with a parallel light transmittance of less than 60%, and a shortest distance between a surface in a thickness direction of the interlayer film and a surface in a thickness direction of the colored layer is 10 µm or more.

In a specific aspect of the interlayer film according to the present invention, at least one of surfaces in a thickness direction of the interlayer film in the colored region has protrusions and recesses formed by an emboss roll method, and a maximum value of ten-point average roughness Rz of the surface having protrusions and recesses of the interlayer film in the colored region is 9 µm or more.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass including a first lamination glass member, a second lamination glass member, and an interlayer film for laminated glass, the interlayer film for laminated glass being arranged between the first lamination glass member and the second lamination glass member, when parallel light transmittance being measured for the laminated glass, the laminated glass having a colored region with a parallel light transmittance of less than 60%, and a transparent region with a parallel light transmittance of 60% or more, the interlayer film having an average thickness in the colored region smaller than an average thickness in the transparent region, and the interlayer film having an absolute value of difference between the average thickness in the colored region and the average thickness in the transparent region of 10 µm or more.

Effect of the Invention

In the interlayer film according to the present invention, when the interlayer film is arranged between two sheets of clear glass conforming to JIS R3202:1996 to obtain a laminated glass X, and parallel light transmittance is measured for the obtained laminated glass X, the interlayer film has a colored region with a parallel light transmittance of less than 60%, and a transparent region with a parallel light transmittance of 60% or more. In the interlayer film according to the present invention, the interlayer film has an average thickness in the colored region smaller than an average thickness in the transparent region, and the interlayer film has an absolute value of difference between the average thickness in the colored region and the average thickness in the transparent region of 10 μm or more. In the interlayer film according to the present invention, since the above-described configuration is provided, it is possible to suppress color migration.

The laminated glass according to the present invention includes a first lamination glass member, a second lamination glass member, and an interlayer film for laminated glass. In the laminated glass according to the present invention, the interlayer film for laminated glass is arranged between the first lamination glass member and the second lamination glass member. When parallel light transmittance is measured for the laminated glass according to the present invention, the laminated glass has a colored region with a parallel light transmittance of less than 60%, and a transparent region with a parallel light transmittance of 60% or more. In the laminated glass according to the present invention, the interlayer film has an average thickness in the colored region smaller than an average thickness in the transparent region, and the interlayer film has an absolute value of difference between the average thickness in the colored region and the average thickness in the transparent region of 10 μm or more. Since the laminated glass according to the present invention has the above configuration, it is possible to suppress color migration of the interlayer film used in the laminated glass.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an interlayer film for laminated glass in accordance with a third embodiment of the present invention.

FIG. 4(a) is a perspective view schematically showing a roll body prepared by winding the interlayer film for laminated glass shown in FIG. 1, and FIG. 4(b) is an enlarged sectional view of a lamination part of the interlayer film for laminated glass in the roll body.

MODES FOR CARRYING OUT THE INVENTION

Hereinafter, the present invention will be described in detail.
(Interlayer Film for Laminated Glass)

The interlayer film for laminated glass (in the present specification, sometimes abbreviated as "interlayer film") according to the present invention is used for laminated glass. When the interlayer film according to the present invention is arranged between two sheets of clear glass conforming to JIS R3202:1996 to obtain a laminated glass X, and parallel light transmittance is measured for the obtained laminated glass X, the interlayer film has a colored region with a parallel light transmittance of less than 60%, and a transparent region with a parallel light transmittance of 60% or more. In the interlayer film according to the present invention, the interlayer film has an average thickness in the colored region smaller than an average thickness in the transparent region, and the interlayer film has an absolute value of difference between the average thickness in the colored region and the average thickness in the transparent region of 10 μm or more.

In the interlayer film according to the present invention, since the above-described configuration is provided, it is possible to suppress color migration. In the interlayer film according to the present invention, even when the interlayer film is stored while it is overlapped as in the form of a roll body, the colored region is less likely to come into contact with other part. Therefore, in the interlayer film according to the present invention, it is possible to suppress color migration. Therefore, it is possible to obtain a laminated glass having excellent appearance by using the interlayer film according to the present invention.

The interlayer film has a one-layer structure or a two or more-layer structure. The interlayer film may have a one-layer structure and may have a two or more-layer structure. The interlayer film may have a two-layer structure, may have a three-layer structure, may have a three or more-layer structure, may have a four or more-layer structure, may have a five or more-layer structure, and may have a six or more-layer structure. The interlayer may be an interlayer film having a one-layer structure including only a first layer (single-layered interlayer film) and may be an interlayer film having a two or more-layer structure including a first layer and another layer (multi-layered interlayer film). The interlayer film may have these structures in part of the interlayer film or in the entire interlayer film. The structure of the interlayer film may partially vary.

In the present invention, the interlayer film is arranged between two sheets of clear glass conforming to JIS R3202:1996 to obtain a laminated glass X. It is preferred that the laminated glass X be prepared in the following manner.

The interlayer film is sandwiched between two sheets of clear glass conforming to JIS R3202:1996 having a thickness of 2 mm to obtain a laminate. The obtained laminate is put into a rubber bag and the inside thereof is degassed for 20 minutes with a degree of vacuum of 2.6 kPa, after which the laminate in the degassed condition is transferred into an oven, and vacuum-pressed by retention at 90° C. for 30 minutes, and thus the laminate is preliminarily press-bonded. The preliminarily press-bonded laminate is subjected to press-bonding for 20 minutes under conditions of 135° C. and a pressure of 1.2 MPa in an autoclave to obtain the laminated glass X.

In the present invention, when parallel light transmittance is measured for the obtained laminated glass X, the interlayer film has a colored region with a parallel light transmittance of less than 60%, and a transparent region with a parallel light transmittance of 60% or more. The interlayer film may have the colored region on the one end side in the widthwise direction, and may have the transparent region on the other end side opposite to the one end. In the colored region, there may exist a colored layer with a parallel light transmittance of less than 60%, and a layer other than the colored layer (layer with a parallel light transmittance of 60% or more) in the thickness direction of the interlayer film. In this case, the colored region includes the colored layer, and the layer other than the colored layer (for example, the part on the left side of the broken line in FIGS. 1 to 3). The colored region with a parallel light transmittance of less than 60% of the interlayer film is a region corresponding to the colored region with a parallel light transmittance of less than 60% of the laminated glass X. The transparent region with a parallel light transmittance of 60% or more of the interlayer film is a region corresponding to the transparent region with a parallel light transmittance of 60% or more of the laminated glass X.

The parallel light transmittance is measured in accordance with JIS R3106:1998. Specifically, measurement is conducted in the following manner. It is preferred that one end of the interlayer film be one end of the laminated glass X, and it is preferred that the other end of the interlayer film be the other end of the laminated glass X.

The laminated glass X is placed parallel with the normal line of the light axis on the optical path between the light source and the integrating sphere at a point 13 cm away from the integrating sphere so that only the transmitted parallel light is received by the integrating sphere with a spectrophotometer. The parallel light transmittance means a visible light transmittance calculated from the spectral transmittance measured in this condition. Examples of the spectrophotometer include "U-4100" available from Hitachi High-Tech Corporation.

It is preferred that the interlayer film include a plurality of layers on one end side of the widthwise direction. It is preferred that the interlayer film include a plurality of layers in the colored region. In this case, the interlayer film may include a colored layer containing a coloring agent, and a layer other than the colored layer in the colored region.

FIG. 1 is a sectional view schematically showing an interlayer film for laminated glass in accordance with a first embodiment of the present invention.

An interlayer film 11 shown in FIG. 1 is used for obtaining laminated glass. The interlayer film 11 is an interlayer film for laminated glass.

The interlayer film 11 includes a first layer 1, a second layer 2, and a third layer 3. The second layer 2 is arranged on a first surface side (one surface) of the first layer 1. The second layer 2 is layered on the first surface of the first layer 1. The first layer 1 and the second layer 2 are in contact with each other. The third layer 3 is arranged on a second surface side opposite to the first surface of the first layer 1. The third layer 3 is layered on the second surface of the first layer 1. The first layer 1 and the third layer 3 are in contact with each other. The first layer 1 is arranged between the second layer 2 and the third layer 3 to be sandwiched therebetween. Each of the first layer 1, the second layer 2, and the third layer 3 is a layer with a parallel light transmittance of 60% or more. In the interlayer film 11, the layer structure excluding the colored layer is a multilayer structure.

The interlayer film 11 has a lengthwise direction and a widthwise direction. The right and left direction of FIG. 1 is the widthwise direction.

The interlayer film 11 includes a colored layer 4 (fourth layer) with a parallel light transmittance of less than 60%. The colored layer 4 contains a coloring agent. The colored layer 4 is embedded in the second layer 2. The colored layer 4 is embedded in the second layer 2 on one end side of the interlayer film 11. On one end side in the widthwise direction of the interlayer film 11, the colored layer 4 is embedded in the second layer 2.

The interlayer film 11 has a colored region X with a parallel light transmittance of less than 60% in the part including the colored layer 4. The colored region X is, for example, a region that is colored in planar view of the interlayer film 11. The interlayer film 11 has a transparent region Y with a parallel light transmittance of 60% or more in a part not including the colored layer 4. The transparent region Y is, for example, a region that is not colored in planar view of the interlayer film 11. The entire part on the left side of the broken line in FIG. 1 is called the colored region X. The entire part on the right side of the broken line in FIG. 1 is called the transparent region Y.

The interlayer film 11 has a multilayer structure in which the second layer 2, the colored layer 4, the second layer 2, the first layer 1, and the third layer 3 are arranged in this order in the colored region X. The interlayer film 11 has a five-layer structure in the colored region X.

The transparent region Y is located on the other end side of the interlayer film 11. The transparent region Y is located closer to the other end of the interlayer film 11 than the colored region X. The interlayer film 11 has a multilayer structure in which the second layer 2, the first layer 1, and the third layer 3 are arranged in this order in the transparent region Y. The interlayer film 11 has a three-layer structure in the transparent region Y.

The colored region X is located on the one end side of the interlayer film 11. The colored region X is located closer to the one end of the interlayer film 11 than the transparent region Y. The thickness of the colored layer 4 decreases from the one end side to the other end side in the widthwise direction of the interlayer film 11. Therefore, in the interlayer film 11, the parallel light transmittance increases from the one end side to the other end side of the widthwise direction in the colored region X.

An average thickness of the first layer 1 in the colored region X is the same as an average thickness of the first layer 1 in the transparent region Y. An average thickness of the second layer 2 in the colored region X is different from an average thickness of the second layer 2 in the transparent region Y. An average thickness of the second layer 2 in the colored region X is smaller than an average thickness of the second layer 2 in the transparent region Y. An average thickness of the third layer 3 in the colored region X is the same as an average thickness of the third layer 3 in the transparent region Y.

In the interlayer film 11, an average thickness of the interlayer film 11 in the colored region X is smaller than an average thickness of the interlayer film 11 in the transparent region Y.

It is preferred that an outer surface on the side opposite to the first layer 1 side of the second layer 2 be a surface on which a lamination glass member is laminated. It is preferred that an outer surface on the side opposite to the first layer 1 side of the third layer 3 be a surface on which a lamination glass member is laminated.

FIG. 4(a) is a perspective view schematically showing a roll body prepared by winding the interlayer film for laminated glass shown in FIG. 1, and FIG. 4(b) is an enlarged sectional view of a lamination part of the interlayer film for laminated glass in the roll body. FIG. 4(b) is a sectional view along the line I-I in FIG. 4(a).

As shown in FIG. 4(a), the interlayer film 11 may be wound to be formed into a roll body 51 of the interlayer film 11.

The roll body 51 includes a winding core 61 and the interlayer film 11. The interlayer film 11 is wound around an outer periphery of the winding core 61.

In FIG. 4(b), the part in which the interlayer film 11 is wound around three times is illustrated in enlargement. In the interlayer film 11, even in the state of the roll body 51, the colored regions X are unlikely to be in contact with each other, and there is a gap between the colored regions X. Therefore, it is possible to suppress color migration. Also, even if the colored regions X come into contact with each other, color migration can be suppressed because the colored regions X are unlikely to adhere to each other firmly.

FIG. 2 is a sectional view schematically showing an interlayer film for laminated glass in accordance with a second embodiment of the present invention.

An interlayer film 11A shown in FIG. 2 is used for obtaining laminated glass. The interlayer film 11A is an interlayer film for laminated glass. In the interlayer film 11A, the layer structure excluding the colored layer is a monolayer structure.

The interlayer film 11A includes a first layer 1A. The first layer 1A is a layer with a parallel light transmittance of 60' or more.

The interlayer film 11A has a lengthwise direction and a widthwise direction. The right and left direction of FIG. 2 is the widthwise direction.

The interlayer film 11A includes a colored layer 4A (the second layer, or the fourth layer when the second layer and the third layer are layers of missing numbers) with a parallel light transmittance of less than 60%. The colored layer 4A contains a coloring agent. The colored layer 4A is embedded in the first layer 1A. On the one end side of the interlayer film 11A, the colored layer 4A is embedded in the first layer 1A.

The interlayer film 11A has a colored region X with a parallel light transmittance of less than 60% in the part including the colored layer 4A. The colored region X is, for example, a region that is colored in planar view of the interlayer film 11A. The interlayer film 11A has a transparent region Y with a parallel light transmittance of 60% or more in a part not including the colored layer 4A. The transparent region Y is, for example, a region that is not colored in planar view of the interlayer film 11A. The entire part on the left side of the broken line in FIG. 2 is called the colored region X. The entire part on the right side of the broken line in FIG. 2 is called the transparent region Y.

The interlayer film 11A has a multilayer structure in which the first layer 1A, the colored layer 4A, and the first layer 1A are arranged in this order in the colored region X. The interlayer film 11A has a three-layer structure in the colored region X.

The colored region X is located on the one end side of the interlayer film 11A. The colored region X is located closer to the one end of the interlayer film 11A than the transparent region Y. The interlayer film 11A has a one-layer structure in the transparent region Y.

The colored region X is located on the one end side of the interlayer film 11A. The colored region X is located closer to the one end of the interlayer film 11A than the transparent region Y. The thickness of the colored layer 4A decreases from the one end side to the other end side in the widthwise direction of the interlayer film 11A. Therefore, in the interlayer film 11A, the parallel light transmittance increases from the one end side to the other end side of the widthwise direction in the colored region X.

An average thickness of the first layer 1A in the colored region X is different from an average thickness of the first layer 1A in the transparent region Y. An average thickness of the first layer 1A in the colored region X is smaller than an average thickness of the first layer 1A in the transparent region Y.

In the interlayer film 11A, an average thickness of the interlayer film 11A in the colored region X is smaller than an average thickness of the interlayer film 11A in the transparent region Y.

FIG. 3 is a sectional view schematically showing an interlayer film for laminated glass in accordance with a third embodiment of the present invention.

An interlayer film 11B shown in FIG. 3 is used for obtaining laminated glass. The interlayer film 11B is an interlayer film for laminated glass.

The interlayer film 11 shown in FIG. 1 and the interlayer film 11B shown in FIG. 3 are different from each other in the thickness of the second layer and the shape of the third layer in the colored region.

The interlayer film 11B includes a first layer 1B, a second layer 2B, and a third layer 3B. Each of the first layer 1B, the second layer 2B, and the third layer 3B is a layer with a parallel light transmittance of 60% or more. In the interlayer film 11B, the layer structure excluding the colored layer is a multilayer structure.

The interlayer film 11B has a lengthwise direction and a widthwise direction. The right and left direction of FIG. 3 is the widthwise direction.

The interlayer film 11B includes a colored layer 4B (fourth layer) with a parallel light transmittance of less than 60%. The colored layer 4B contains a coloring agent. The colored layer 4B is embedded in the second layer 2B. On the one end side of the interlayer film 11B, the colored layer 4B is embedded in the second layer 2B. On the one end side in the widthwise direction of the interlayer film 11B, the colored layer 4B is embedded in the second layer 2B.

The interlayer film 11B has a colored region X with a parallel light transmittance of less than 60% in the part including the colored layer 4B. The colored region X is, for example, a region that is colored in planar view of the interlayer film 11B. The interlayer film 11B has a transparent region Y with a parallel light transmittance of 60% or more in a part not including the colored layer 4B. The transparent region Y is, for example, a region that is not colored in planar view of the interlayer film 11B. The entire part on the left side of the broken line in FIG. 3 is called the colored region X. The entire part on the right side of the broken line in FIG. 3 is called the transparent region Y.

While an average thickness of the first layer 1B in the colored region X is the same as an average thickness of the first layer 1B in the transparent region Y, these average thicknesses may differ. While an average thickness of the second layer 2B in the colored region X, and an average thickness of the second layer 2B in the transparent region Y are different from each other, and the average thickness of the second layer 2B in the colored region X is smaller than the average thickness of the second layer 2B in the transparent region Y, these average thicknesses may be the same. While an average thickness of the third layer 3B in the colored region X, and an average thickness of the third layer 3B in the transparent region Y are different from each other, and the average thickness of the third layer 3B in the colored region X is smaller than the average thickness of the third layer 3B in the transparent region Y, these average thicknesses may be the same.

In the interlayer film 11B, an average thickness of the interlayer film 11B in the colored region X is smaller than an average thickness of the interlayer film 11B in the transparent region Y.

The layer in which the average thickness differs between the colored region X and the transparent region X may be the first layer, may be the second layer, and may be the third layer. The number of layers in which the average thickness differs between the colored region X and the transparent region X may be one layer, may be two layers, may be two or more layers, may be three layers, may be three or more layers, and may be all layers. The number of layers in which the average thickness differs between the colored region X and the transparent region X may be three or less layers and may be two or less layers. The shape in which the average thickness differs between the colored region X and the transparent region X is not particularly limited.

In the interlayer film, other layer may be arranged between the first layer and the second layer and between the first layer and the third layer, respectively. In the interlayer film, it is preferred that the first layer and the second layer, and the first layer and the third layer be directly layered, respectively.

The interlayer film may include only one colored layer, and may include a plurality of colored layers. The colored layer may be embedded in the first layer, may be arranged between the first layer and the second layer, may be arranged on a side opposite to the first layer side of the second layer, may be embedded in the third layer, may be arranged between the first layer and the third layer, and may be arranged on a side opposite to the first layer side of the third layer. The colored layer may be located on a surface of the interlayer film.

The thickness of the colored layer may decrease or increase, and may be constant from the one end side to the other end side in the widthwise direction of the interlayer film. In the interlayer film, the parallel light transmittance may be constant and may vary from the one end side to the other end side in the widthwise direction in the colored region X. In the interlayer film, the parallel light transmittance may increase or decrease from the one end side to the other end side in the widthwise direction in the colored region X. In the interlayer film, the parallel light transmittance in the colored region X may vary owing to variation in concentration of the coloring agent contained in the colored layer. For example, in the interlayer film, the parallel light transmittance may increase from the one end side to the other end side in the colored region X owing to decrease in concentration of the coloring agent contained in the colored layer from the one end side to the other end side in the widthwise direction of the interlayer film.

An average thickness of the interlayer film in the colored region is described as "average thickness (X) of interlayer film", and an average thickness of the interlayer film in the transparent region is described as "average thickness (Y) of interlayer film". From the viewpoint of exerting the effect of the present invention, the average thickness (X) of interlayer film is smaller than the average thickness (Y) of interlayer film. Also, from the viewpoint of exerting the effect of the present invention, an absolute value of difference between the average thickness (X) of interlayer film and the average thickness (Y) of interlayer film is 10 μm or more.

The absolute value of difference between the average thickness (X) of interlayer film and the average thickness (Y) of interlayer film is preferably 15 μm or more, more preferably 20 μm or more, still more preferably 25 μm or more, further preferably 30 μm or more, still further preferably 50 μm or more, especially preferably 75 μm or more, most preferably 100 μm or more. The absolute value of difference between the average thickness (X) of interlayer film and the average thickness (Y) of interlayer film is preferably 1500 μm or less, more preferably 1200 μm or less, further preferably 900 μm or less, especially preferably 600 μm or less. When the absolute value of difference is the above lower limit or more, it is possible to exert the effect of the present invention more effectively. When the absolute value of difference is the above upper limit or less, it is possible to enhance the production efficiency of the interlayer film.

It is preferred that the colored region have a colored layer with a parallel light transmittance of less than 60%. The parallel light transmittance of the colored layer can be determined in the same manner as described above using a colored layer that is obtained by peeling off the colored layer from the interlayer film, or by molding a composition for forming a colored layer. When the colored layer is arranged between two sheets of clear glass conforming to JIS R3202: 1996 to obtain a laminated glass Y, and parallel light transmittance is measured for the obtained laminated glass Y, it is preferred that the colored layer have a parallel light transmittance of less than 60%. The colored layer with a parallel light transmittance of colored layer of less than 60% corresponds to a laminated glass Y with a parallel light transmittance of 60%. The laminated glass Y can be prepared in the same manner as for the laminated glass X except that a colored layer is used in place of the interlayer film.

An average thickness of the first layer in the colored region is described as "average thickness (X1) of first layer", and an average thickness of the first layer in the transparent region is described as "average thickness (Y1) of first layer". An average thickness of the second layer in the colored region is described as "average thickness (X2) of second layer", and an average thickness of the second layer in the transparent region is described as "average thickness (Y2) of second layer". An average thickness of the third layer in the colored region is described as "average thickness (X3) of third layer", and an average thickness of the third layer in the transparent region is described as "average thickness (Y3) of third layer". An average thickness of the colored layer in the colored region is described as "average thickness (X4) of colored layer".

A ratio of the average thickness (X1) of the first layer to the average thickness (X) of the interlayer film is described as a ratio (average thickness (X1) of first layer/average thickness (X) of interlayer film). The ratio (average thickness (X1) of first layer/average thickness (X) of interlayer film) is preferably 0.035 or more, more preferably 0.0625 or more, further preferably 0.1 or more, and is preferably 0.4 or less, more preferably 0.375 or less, further preferably 0.25 or less, especially preferably 0.15 or less. When the ratio (average thickness (X1) of first layer/average thickness (X) of interlayer film) is 0.4 or less, rigidity such as flexural rigidity is further improved.

A ratio of the average thickness (Y1) of the first layer to the average thickness (Y) of the interlayer film is described as a ratio (average thickness (Y1) of first layer/average thickness (Y) of interlayer film). The ratio (average thickness (Y1) of first layer/average thickness (Y) of interlayer film) is preferably 0.035 or more, more preferably 0.0625 or more, further preferably 0.1 or more, and is preferably 0.4 or less, more preferably 0.375 or less, further preferably 0.25 or less, especially preferably 0.15 or less. When the ratio (average thickness (Y1) of first layer/average thickness (Y) of interlayer film) is 0.4 or less, rigidity such as flexural rigidity is further improved.

A ratio of the average thickness (X2) of the second layer to the average thickness (X) of the interlayer film (average thickness (X2) of second layer/average thickness (X) of interlayer film) is preferably 0.3 or more, more preferably 0.3125 or more, further preferably 0.375 or more, and is preferably 0.97 or less, more preferably 0.9375 or less, further preferably 0.9 or less. The ratio (average thickness (X2) of second layer/average thickness (X) of interlayer film) may be 0.46875 or less, and may be 0.45 or less. When the ratio (average thickness (X2) of second layer/average thickness (X) of interlayer film) is the above lower limit or more and the above upper limit or less, the rigidity and the sound insulating property of the laminated glass is further improved.

A ratio of the average thickness (Y2) of the second layer to the average thickness (Y) of the interlayer film (average thickness (Y2) of second layer/average thickness (Y) of interlayer film) is preferably 0.3 or more, more preferably 0.3125 or more, further preferably 0.375 or more, and is preferably 0.97 or less, more preferably 0.9375 or less, further preferably 0.9 or less. The ratio (average thickness (Y2) of second layer/average thickness (Y) of interlayer film) may be 0.46875 or less, and may be 0.45 or less. When the ratio (average thickness (Y2) of second layer/average thickness (Y) of interlayer film) is the above lower limit or more and the above upper limit or less, the rigidity and the sound insulating property of the laminated glass is further improved.

A ratio of the average thickness (X3) of the third layer to the average thickness (X) of the interlayer film (average thickness (X3) of third layer/average thickness (X) of interlayer film) is preferably 0.3 or more, more preferably 0.3125 or more, further preferably 0.375 or more, and is preferably 0.97 or less, more preferably 0.9375 or less, further preferably 0.9 or less. The ratio (average thickness (X3) of third layer/average thickness (X) of interlayer film) may be 0.46875 or less, and may be 0.45 or less. When the ratio (average thickness (X3) of third layer/average thickness (X) of interlayer film) is the above lower limit or more and the above upper limit or less, the rigidity and the sound insulating property of the laminated glass is further improved.

A ratio of the average thickness (Y3) of the third layer to the average thickness (Y) of the interlayer film (average thickness (Y3) of third layer/average thickness (Y) of interlayer film) is preferably 0.3 or more, more preferably 0.3125 or more, further preferably 0.375 or more, and is preferably 0.97 or less, more preferably 0.9375 or less, further preferably 0.9 or less. The ratio (average thickness (Y3) of third layer/average thickness (Y) of interlayer film) may be 0.46875 or less, and may be 0.45 or less. When the ratio (average thickness (Y3) of third layer/average thickness (Y) of interlayer film) is the above lower limit or more and the above upper limit or less, the rigidity and the sound insulating property of the laminated glass is further improved.

A ratio of the average thickness (X4) of the colored layer to the average thickness (X) of the interlayer film (average thickness (X4) of colored layer/average thickness (X) of interlayer film) is preferably 0.01 or more, more preferably 0.02 or more, further preferably 0.03 or more, especially preferably 0.04 or more, and is preferably 0.99 or less, more preferably 0.98 or less, further preferably 0.97 or less.

As a measuring device for use for measuring the thickness of the interlayer film, a contact type thickness measuring instrument "TOF-4R" (available from Yamabun Electronics Co., Ltd.) or the like can be recited.

Measurement of the thickness is conducted such that the distance is the shortest from the one end toward the other end by using the above-described measuring device at a film conveyance speed of 2.15 mm/minute to 2.25 mm/minute.

As a measuring device for use for measuring the thickness of the interlayer film after the interlayer film is made into laminated glass, a non-contact type multilayer film thickness measuring instrument "OPTIGAUGE" (available from Lumetrics, Inc.) or the like can be recited. Use of the measuring instrument makes it possible to measure the thickness of the interlayer film while the interlayer film is in the laminated glass.

The shortest distance between the surface in the thickness direction of the interlayer film and the surface in the thickness direction of the colored layer is preferably 10 μm or more, more preferably 20 μm or more, and is preferably 3000 μm or less, more preferably 2990 μm or less. When the shortest distance is the above lower limit or more and the above upper limit or less, it is possible to exert the effect of the present invention more effectively.

A dimension of the colored region in the widthwise direction of the interlayer film is preferably 30 mm or more, more preferably 50 mm or more, further preferably 70 mm or more, especially preferably 100 mm or more, and is preferably 1500 mm or less, more preferably 1300 mm or less, further preferably 1000 mm or less, especially preferably 800 mm or less.

A ratio of the dimension of the colored region in the widthwise direction of the interlayer film to the dimension of the interlayer film in the widthwise direction (dimension of the colored region in the widthwise direction of interlayer film/dimension of the interlayer film in the widthwise direction) is preferably 0.03 or more, more preferably 0.05 or more, and is preferably 0.9 or less, more preferably 0.85 or less. The ratio (dimension of the colored region in the widthwise direction of interlayer film/dimension of the interlayer film in the widthwise direction) may be 0.6 or less, may be 0.5 or less, may be 0.4 or less, and may be 0.3 or less.

Hereinafter, materials that can be used in the interlayer film according to the present invention are specifically described.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). It is preferred that the colored layer contain a thermoplastic resin (hereinafter, sometimes described as a thermoplastic resin (4)). It is preferred that the colored layer contain a polyvinyl acetal resin (hereinafter, sometimes described as a polyvinyl acetal resin (4)) as the thermoplastic resin (4). The thermoplastic resin (1), the thermoplastic resin (2), the thermoplastic resin (3), and the thermoplastic resin (4) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), the polyvinyl acetal resin (3), and the polyvinyl acetal resin (4) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), the thermoplastic resin (3), and the thermoplastic resin (4) may be used alone and two or more kinds thereof may be used in combination. One kind of each of the polyvinyl acetal resin (0), the polyvinyl acetal resin (1), the polyvinyl acetal resin (2), the polyvinyl acetal resin (3), and the polyvinyl acetal resin (4) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. The polyvinyl alcohol can be obtained, for example, by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less, further preferably 3500 or less. When the average polymerization degree is the above lower limit or more, the penetration resistance of the laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the first layer, is the same as a preferred range of the content of the hydroxyl group of the polyvinyl acetal resin (1). A preferred range of the content of the hydroxyl group of the polyvinyl acetal resin (4) when the colored layer is not embedded in the second layer and the third layer and the colored layer is not a surface layer of the interlayer film, is the same as a preferred range of the content of the hydroxyl group of the polyvinyl acetal resin (1).

The content of the hydroxyl group (hydroxyl group amount) of the polyvinyl acetal resin (2) and the polyvinyl acetal resin (3) is preferably 25% by mole or more, more preferably 28% by mole or more, still more preferably 30% by mole or more, further preferably 31.5% by mole or more, especially preferably 32% by mole or more, most preferably 33% by mole or more. The content of the hydroxyl group (hydroxyl group amount) of the polyvinyl acetal resin (2) and the polyvinyl acetal resin (3) is preferably 38% by mole or less, more preferably 37' by mole or less, further preferably 36.5n by mole or less, especially preferably 36% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the second layer or the third layer, is the same as a preferred range of the content of the hydroxyl group of the polyvinyl acetal resin (2) and the polyvinyl acetal resin (3). A preferred range of the content of the hydroxyl group of the polyvinyl acetal resin (4) when the colored layer is a surface layer of the interlayer film, is the same as a preferred range of the content of the hydroxyl group of the polyvinyl acetal resin (2) and the polyvinyl acetal resin (3).

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). An absolute value of a difference between the content of the hydroxyl group of the polyvinyl acetal resin (1) and the content of the hydroxyl group of the polyvinyl acetal resin (2) is defined as absolute value A, and an absolute value of a difference between the content of the hydroxyl group of the polyvinyl acetal resin (1) and the content of the hydroxyl group of the polyvinyl acetal resin (3) is defined as absolute value B. From the viewpoint of further enhancing the sound insulating property, each of the absolute value A and the absolute value B is preferably 1% by mole or more, more preferably 5% by mole or more, further preferably 9% by mole or more, especially preferably 10% by mole or more, most preferably 12% by mole or more. Each of the absolute value A and the absolute value B is preferably 20% by mole or less.

When the colored layer is embedded in the first layer, there may be a case that the colored layer is not embedded in the second layer and the third layer, and the colored layer is not a surface layer of the interlayer film. In these cases, from the viewpoint of further enhancing the sound insulating property, it is preferred that the content of the hydroxyl group of the polyvinyl acetal resin (4) be lower than the content of the hydroxyl group of the polyvinyl acetal resin (2). From the viewpoint of further enhancing the sound insulating property, it is preferred that the content of the hydroxyl group of the polyvinyl acetal resin (4) be lower than the content of the hydroxyl group of the polyvinyl acetal resin (3). An absolute value of a difference between the content of the hydroxyl group of the polyvinyl acetal resin (4) and the content of the hydroxyl group of the polyvinyl acetal resin (2) is defined as absolute value C, and an absolute value of a difference between the content of the hydroxyl group of the polyvinyl acetal resin (4) and the content of the hydroxyl group of the polyvinyl acetal resin (3) is defined as absolute value D. From the viewpoint of further enhancing the sound insulating property, each of the absolute value C and the absolute value D is preferably 1% by mole or more, more preferably 5% by mole or more, further preferably 9% by mole or more, especially preferably 10% by mole or more, most preferably 12% by mole or more. Each of the absolute value C and the absolute value D is preferably 20% by mole or less.

There are the cases that the colored layer is embedded in the second layer or in the third layer, and that the colored layer is a surface layer of the interlayer film. In these cases, from the viewpoint of further enhancing the sound insulating property, it is preferred that the content of the hydroxyl group of the polyvinyl acetal resin (1) be lower than the content of the hydroxyl group of the polyvinyl acetal resin (4). From the viewpoint of still further enhancing the sound insulating property, the absolute value of a difference between the content of the hydroxyl group of the polyvinyl acetal resin (1) and the content of the hydroxyl group of the polyvinyl acetal resin (4) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (4) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced. In particular, when the acetylation degree of the polyvinyl acetal resin (1) is 0.1% by mole or more and is 25% by mole or less, the resulting laminated glass is excellent in penetration resistance.

A preferred range of the acetylation degree of the polyvinyl acetal resin (4) when the colored layer is embedded in the first layer, is the same as a preferred range of the acetylation degree of the polyvinyl acetal resin (1). A preferred range of the acetylation degree of the polyvinyl acetal resin (4) when the colored layer is not embedded in the second layer and the third layer and the colored layer is not a surface layer of the interlayer film, is the same as a preferred range of the acetylation degree of the polyvinyl acetal resin (1).

The acetylation degree (acetyl group amount) of each of the polyvinyl acetal resin (2) and the polyvinyl acetal resin (3) is preferably 0.01% by mole or more, more preferably 0.5% by mole or more, and is preferably 10% by mole or less, more preferably 2% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced.

A preferred range of the acetylation degree of the polyvinyl acetal resin (4) when the colored layer is embedded in the second layer or the third layer, is the same as a preferred range of the acetylation degree of the polyvinyl acetal resin (2) and the polyvinyl acetal resin (3). A preferred range of the acetylation degree of the polyvinyl acetal resin (4) when the colored layer is a surface layer of the interlayer film, is the same as a preferred range of the acetylation degree of the polyvinyl acetal resin (2) and the polyvinyl acetal resin (3).

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47° by mole or more and more preferably 60% by mole or more, and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the first layer, is the same as a preferred range of the acetalization degree of the polyvinyl acetal resin (1). A preferred range of the acetalization degree of the polyvinyl acetal resin (4) when the colored layer is not embedded in the second layer and the third layer and the colored layer is not a surface layer of the interlayer film, is the same as a preferred range of the acetalization degree of the polyvinyl acetal resin (1).

The acetalization degree of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the second layer or the third layer, is the same as a preferred range of the acetalization degree of the polyvinyl acetal resin (2) and the polyvinyl acetal resin (3). A preferred range of the acetalization degree of the polyvinyl acetal resin (4) when the colored layer is a surface layer of the interlayer film, is the same as a preferred range of the acetalization degree of the polyvinyl acetal resin (2) and the polyvinyl acetal resin (3).

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70' by weight or more, especially preferably 80% by weight or more, most preferably 90% by weight or more. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin may be 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin may be 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin may be 100% by weight or less. It is preferred that the main ingredient (50% by weight or more) of the thermoplastic resin of the third layer be a polyvinyl acetal resin.

In 100% by weight of the thermoplastic resin contained in the colored layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the colored layer, the content of the polyvinyl acetal resin may be 100% by weight or less. It is preferred that the main ingredient (50% by weight or more) of the thermoplastic resin of the colored layer be a polyvinyl acetal resin.

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). It is preferred that the colored layer contain a plasticizer (hereinafter, sometimes described as a plasticizer (4)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the adipic acid ester, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

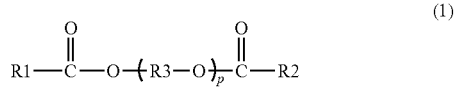

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate (3GO).

In the interlayer film, the content of the plasticizer (0) per 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of the laminated glass is further enhanced. When the content (0) is the above upper limit or less, the transparency of the interlayer film is further enhanced.

In the colored layer, the content of the plasticizer (4) per 100 parts by weight of the thermoplastic resin (4) is defined as content (4). In the interlayer film in which the layer structure excluding the colored layer is a monolayer structure, a preferred range of the content (4) is the same as the preferred range of the content (0) when the colored layer is embedded in the first layer.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the colored layer, the content of the plasticizer (4) per 100 parts by weight of the thermoplastic resin (4) is defined as content (4). In the interlayer film in which the layer structure excluding the colored layer is a multilayer structure, a preferred range of the content (4) is the same as the preferred range of the content (1) when the colored layer is embedded in the first layer. When the colored layer is not embedded in the second layer and the third layer, and the colored layer is not a surface layer of the interlayer film, a preferred range of the content (4) is the same as the preferred range of the content (1).

In the second layer, the content of the plasticizer (2) per 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of the laminated glass is further enhanced.

In the colored layer, the content of the plasticizer (4) per 100 parts by weight of the thermoplastic resin (4) is defined as content (4). In the interlayer film in which the layer structure excluding the colored layer is a multilayer structure, a preferred range of the content (4) is the same as the preferred ranges of the content (2) and the content (3) when the colored layer is embedded in the second layer or the third layer. When the colored layer is a surface layer of the interlayer film, a preferred range of the content (4) is the same as the preferred ranges of the content (2) and the content (3).

For the purpose of enhancing the sound insulating property of the laminated glass, it is preferred that the content (1) be larger than the content (2) and it is preferred that the content (1) be larger than the content (3).

For the purpose of enhancing the sound insulating property of laminated glass, it is preferred that the content (4) be larger than the content (2) and it is preferred that the content (4) be larger than the content (3), when the colored layer is embedded in the first layer and when the colored layer is not a surface layer of the interlayer film.

For the purpose of enhancing the sound insulating property of laminated glass, it is preferred that the content (1) be larger than the content (4) when the colored layer is embedded in the second layer or the third layer, and when the colored layer is a surface layer of the interlayer film.

From the viewpoint of further enhancing the sound insulating property of the laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

When the colored layer is embedded in the first layer, there may be a case that the colored layer is not embedded in the second layer and the third layer, and the colored layer is not a surface layer of the interlayer film. In this case, from the viewpoint of further enhancing the sound insulating property of laminated glass, each of the absolute value of difference between the content (2) and the content (4) and the absolute value of difference between the content (3) and the content (4) is preferably 10 parts by weight or more, more preferably 15 parts by weight or more, and further preferably 20 parts by weight or more. Each of the absolute value of difference between the content (2) and the content (4) and the absolute value of difference between the content (3) and the content (4) is preferably 80 parts by weight or less, more preferably 75 parts by weight or less, further preferably 70 parts by weight or less.

When the colored layer is embedded in the second layer or the third layer, and when the colored layer is a surface layer of the interlayer film, the absolute value of difference between the content (4) and the content (1) is preferably 10 parts by weight or more, more preferably 15 parts by weight or more, and further preferably 20 parts by weight or more from the viewpoint of further enhancing the sound insulating property of laminated glass. The absolute value of difference between the content (4) and the content (1) is preferably 80 parts by weight or less, more preferably 75 parts by weight or less, further preferably 70 parts by weight or less.

(Coloring Agent)

It is preferred that the interlayer film contain a coloring agent. It is preferred that the colored layer contain a coloring agent. It is preferred that the colored layer contain a coloring agent in such an amount that gives a parallel light transmittance of the colored region of less than 60%. It is more preferred that the colored layer contain a coloring agent in such an amount that gives a parallel light transmittance of the colored layer of less than 60%. Each of the first layer, the second layer and the third layer may contain a coloring agent in such an amount that gives a parallel light transmittance of the transparent region of 60% or more. The first layer may contain a coloring agent in such an amount that gives a parallel light transmittance of the first layer of 60% or more. The second layer may contain a coloring agent in such an amount that gives a parallel light transmittance of the second layer of 60% or more. The third layer may contain a coloring agent in such an amount that gives a parallel light transmittance of the third layer of 60% or more.

Typically, a content of the coloring agent in 100% by weight of the first layer is smaller than a content of the coloring agent in 100% by weight of the colored layer. Typically, a content of the coloring agent in 100% by weight of the second layer is smaller than a content of the coloring agent in 100% by weight of the colored layer. Typically, a content of the coloring agent in 100% by weight of the third layer is smaller than a content of the coloring agent in 100% by weight of the colored layer. The first layer need not contain a coloring agent. The second layer need not contain a coloring agent. The third layer need not contain a coloring agent.

Examples of the coloring agent include inorganic particles, a pigment, a dye and the like. It is preferred that the colored layer contain a pigment or a dye. The colored layer may contain inorganic particles, may contain a pigment, and may contain a dye. Each of the first layer, the second layer and the third layer need not contain inorganic particles, need not contain a pigment, and need not contain a dye.

Examples of the inorganic particles include carbon black particles, carbon nanotube particles, graphene particles, iron oxide particles, zinc oxide particles, calcium carbonate particles, alumina particles, kaolin clay particles, calcium silicate particles, magnesium oxide particles, magnesium hydroxide particles, aluminum hydroxide particles, magnesium carbonate particles, talc particles, feldspar powder particles, mica particles, barite particles, barium carbonate particles, titanium oxide particles, silica particles, and glass beads, and the like. One kind of the inorganic particles may be used alone, and two or more kinds thereof may be used in combination.

It is preferred that the inorganic particles include carbon black particles, carbon nanotube particles, graphene particles, calcium carbonate particles, titanium oxide particles or silica particles, and it is more preferred that the inorganic particles include calcium carbonate particles. By using these preferred inorganic particles, unevenness in appearance is suppressed when the light penetrates, and laminated glass having still further excellent appearance designability is obtained.

The average particle diameter of the inorganic particles is preferably 0.01 μm or more, more preferably 0.5 μm or more, and is preferably 100 μm or less, more preferably 50 μm or less, further preferably 10 μm or less. The average particle diameter refers to the weight average particle diameter. The average particle diameter can be measured by a dynamic light scattering method with a light scattering measuring device and a laser as a light source. Examples of the light scattering measuring device include "DLS-6000AL" available from OTSUKA ELECTRONICS Co., LTD., and the like.

Examples of the dye include a pyrene-based dye, an aminoketone-based dye, an anthraquinone-based dye, and an azo-based dye, and the like. One kind of the dye may be used alone, and two or more kinds thereof may be used in combination.

Examples of the pyrene-based dye include Solvent Green 5 (CAS79869-59-3) and Solvent Green 7 (CAS6358-69-6), and the like.

Examples of the aminoketone-based dye include Solvent Yellow 98 (CAS12671-74-8), Solvent Yellow 85 (CAS12271-01-1) and Solvent Red 179 (CAS8910-94-5), and Solvent Red 135 (CAS71902-17-5), and the like.

Examples of the anthraquinone-based dye include Solvent Yellow 163 (CAS13676091-0), Solvent Red 207 (CAS15958-69-6), Disperse Red 92 (CAS12236-11-2), Solvent Violet 13 (CAS81-48-1), Disperse Violet 31 (CAS6408-72-6), Solvent Blue 97 (CAS61969-44-6), Solvent Blue 45 (CAS37229-23-5), Solvent Blue 104 (CAS116-75-6) and Disperse Blue 214 (CAS104491-84-1), and the like.

Examples of the azo-based dye include Solvent Yellow30 (CAS3321-10-4), Solvent Red 164 (CAS70956-30-8), and Disperse Blue 146 (CAS88650-91-3), and the like.

The pigment may be an organic pigment and may be an inorganic pigment. The organic pigment may be an organic pigment having a metal atom, and may be an organic pigment not having a metal atom. One kind of the pigment may be used alone, and two or more kinds thereof may be used in combination.

Examples of the organic pigment include a phthalocyanine compound, a quinacridone compound, an azo compound, a pentaphene compound, a perylene compound, an indole compound and a dioxazine compound, and the like.

Examples of the coloring agent include a dark red-brown mixed pigment in which a black pigment (carbon black), a red pigment (C. I. Pigment red), a blue pigment (C. I. Pigment blue), and a yellow pigment (C. I. Pigment yellow) are mixed.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. It is preferred that the colored layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles. The heat shielding substance can correspond to the above-described coloring agent.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. It is preferred that the colored layer contain the Ingredient X. The Ingredient X is a heat shielding substance. One kind of the Ingredient X may be used alone and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding property and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first layer, a second layer, a third layer, or a colored layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, a third layer, or a colored layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. It is preferred that the colored layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles.

It is preferred that the heat shielding particle be a particle (a metal oxide particle) formed from an oxide of a metal.

The energy amount of an infrared ray with a wavelength (780 nm or more) that is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, tungsten oxide particles, tin-doped indium oxide particles (ITO particles), tin-doped zinc oxide particles and silicon-doped zinc oxide particles, and lanthanum hexaboride ($LaB_6$) particles, and the like. Heat shielding particles other than these may be used as the heat shielding particles. For high heat ray shielding function, the heat shielding particles are preferably metal oxide particles, and more preferably ATO particles, GZO particles, IZO particles, ITO particles or tungsten oxide particles. In particular, since the heat ray shielding function is high and the particles are readily available, it is preferred that the heat shielding particles be ITO particles or tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding property is sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film contain at least one kind of metal salt (hereinafter, sometimes described as Metal salt M) of alkali metal salts and alkali earth metal salts. It is preferred that the first layer contain the Metal salt M. It is preferred that the second layer contain the Metal salt M. It is preferred that the third layer contain the Metal salt M. It is preferred that the colored layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

As the metal salt M, an alkali metal salt of an organic acid having 2 to 16 carbon atoms, and an alkali earth metal salt of an organic acid having 2 to 16 carbon atoms can be used. The metal salt M may include a magnesium carboxylate having 2 to 16 carbon atoms, or a potassium carboxylate having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, a third layer, or a colored layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a lamination glass member such as a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. It is preferred that the colored layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis (1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, the visible light transmittance becomes still less likely to decrease even when the interlayer film and the laminated glass are used for a long period. In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 2.5% by weight or less, more preferably 2, by weight or less, further preferably 1% by weight or less, especially preferably 0.8% by weight or less. Especially, by setting the content of the ultraviolet ray screening agent to be 0.2% by weight or more in 100% by weight of a layer containing the ultraviolet ray screening agent, the visible light transmittance becomes still less likely to decrease even when the interlayer film and the laminated glass are used for a long period.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. It is preferred that the colored layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl)phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, a third layer, or a colored layer). Moreover, since an effect commensurate with the addition of an oxidation inhibitor is not attained, it is preferred that the content of the oxidation inhibitor be 2% by weight or less in 100% by weight of the interlayer film or in 100% by weight of a layer containing the oxidation inhibitor.

(Other Ingredients)

Each of the interlayer film, the first layer, the second layer, the third layer, and the colored layer may contain additives such as a coupling agent, a dispersing agent, a surfactant, a flame retardant, an antistatic agent, an adhesive strength regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The interlayer film may be wound to be formed into a roll body of the interlayer film. The roll body may include a winding core and an interlayer film wound on the outer periphery of the winding core.

The method for producing the interlayer film is not particularly limited. In the case of a single-layered interlayer film, examples of the production method of the interlayer film include a method of extruding a resin composition with an extruder. One exemplary method for forming the interlayer film in the case of a multi-layered interlayer film includes separately forming respective layers by using resin compositions for forming respective layers, and then layering the obtained layers. Further, one exemplary method for forming the interlayer film includes co-extruding resin compositions for forming respective layers using extruder to layer the respective layers. A production method of extrusion-molding is preferred because the method is suitable for continuous production. By adjusting the shape of the die outlet, it is possible to satisfactorily produce the interlayer film having a specific thickness shape.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that at least one of surfaces in the thickness direction of the interlayer film have protrusions and recesses, and it is more preferred that both of surfaces in the thickness direction of the interlayer film have protrusions and recesses. It is preferred that at least one of surfaces in the thickness direction of the interlayer film in the colored region have protrusions and recesses, and it is more preferred that both of surfaces in the thickness direction of the interlayer film in the colored region have protrusions and recesses. It is preferred that at least one of surfaces in the thickness direction of the interlayer film in the transparent region have protrusions and recesses, and it is more preferred that both of surfaces in the thickness direction of the interlayer film in the transparent region have protrusions and recesses.

Examples of the method for forming the protrusions and recesses include, but are not particularly limited to, a lip emboss method, an emboss roll method, a calender roll method, and a profile extrusion method, and the like.

It is preferred that at least one of surfaces in the thickness direction of the interlayer film have protrusions and recesses formed by an emboss roll method, and it is more preferred that both of surfaces in the thickness direction of the interlayer film have protrusions and recesses formed by an emboss roll method. It is preferred that at least one of surfaces in the thickness direction of the interlayer film in the colored region have protrusions and recesses formed by an emboss roll method, and it is more preferred that both of surfaces in the thickness direction of the interlayer film in the colored region have protrusions and recesses formed by an emboss roll method. It is preferred that at least one of surfaces in the thickness direction of the interlayer film in the transparent region have protrusions and recesses formed by an emboss roll method, and it is more preferred that both of surfaces in the thickness direction of the interlayer film in the transparent region have protrusions and recesses formed by an emboss roll method. In this case, a large number of embosses of the protrusions and recesses, which is a quantitatively constant protrusion and recess pattern, can be formed.

A maximum value of ten-point average roughness Rz of the surface having the protrusions and recesses of the interlayer film in the colored region is preferably 9 μm or more, more preferably 10 μm or more, further preferably 15 μm or more, especially preferably 20 μm or more, and is preferably 100 μm or less, more preferably 95 μm or less, further preferably 90 μm or less.

A maximum value of ten-point average roughness Rz of the surface having the protrusions and recesses of the interlayer film in the transparent region is preferably 9 μm or more, more preferably 10 μm or more, further preferably 15 μm or more, especially preferably 20 μm or more, and is preferably 100 μm or less, more preferably 95 μm or less, further preferably 90 μm or less.

The ten-point average roughness Rz is measured in accordance with JIS B0601:1994. As a measuring device for measuring ten-point average roughness Rz, for example, "Surfcorder SE300" available from Kosaka Laboratory Ltd. may be used. More specifically, the ten-point average roughness Rz can be measured using a stylus having a tip radius of 2 μm and a tip angle of 60° in measurement conditions of a cutoff value at the time of measurement of 2.5 mm, a standard length 2.5 mm, a measurement length of 12.5 mm, a spare length 2.5 mm, and a feed speed of stylus of 0.5 mm/second in an environment of 23° C. and 30 RH %.

The maximum value of ten-point average roughness Rz can be measured, for example, in the following manner. In the widthwise direction of the interlayer film, five points at intervals of 5 mm or more are selected as measuring points. At each measuring point, the measuring device is rotated every 45 degrees and the ten-point average roughness Rz is measured eight times in total, and the maximum value of the measurements is determined as a ten-point average roughness at each measuring point. The maximum value of the obtained ten-point average roughness Rz at the five measuring points is determined as a ten-point average roughness Rz of the surface in the thickness direction of the interlayer film in the colored region or the transparent region.

(Laminated Glass)

The laminated glass according to the present invention includes a first lamination glass member, a second lamination glass member, and an interlayer film for laminated glass. In the laminated glass according to the present invention, the above-mentioned interlayer film for laminated glass is arranged between the first lamination glass member and the second lamination glass member.

In the laminated glass according to the present invention, the interlayer film according to the present invention may be used.

When parallel light transmittance is measured for the laminated glass according to the present invention, it is preferred that the laminated glass have a colored region with a parallel light transmittance of less than 60%, and a transparent region with a parallel light transmittance of 60% or more.

In the laminated glass according to the present invention, it is preferred that the average thickness of the interlayer film in the colored region be smaller than the average thickness of the interlayer film in the transparent region, and an absolute value of difference between the average thickness of the interlayer film in the colored region and the average thickness of the interlayer film in the transparent region be 10 μm or more.

Since the laminated glass according to the present invention has the above configuration, it is possible to suppress color migration of the interlayer film used in the laminated glass. Therefore, in the laminated glass according to the present invention, excellent appearance can be achieved.

The parallel light transmittance of the laminated glass according to the present invention is measured in the same manner as that for the parallel light transmittance of the laminated glass X.

It is preferred that the first lamination glass member be the first glass plate. It is preferred that the second lamination glass member be the second glass plate.

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of each of the first lamination glass member and the second lamination glass member is preferably 1 mm or more, and is preferably 5 mm or less, more preferably 3 mm or less. Moreover, when the lamination glass member is a glass plate, the thickness of the glass plate is preferably 0.5 mm or more, more preferably 0.7 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass for an automobile.

Hereinafter, the present invention will be described in more detail with reference to examples and comparative examples. The present invention is not limited only to these examples.

In polyvinyl acetal resins used, n-butyraldehyde that has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

EXAMPLE 1

Preparation of Resin Composition for Forming First Layer:
  The following ingredients were mixed, and kneaded sufficiently with a mixing roll to obtain a composition for forming a first layer.
    Polyvinyl acetal resin (average polymerization degree: 3000, content of hydroxyl group: 22% by mole, acetylation degree: 13% by mole, acetalization degree: 65% by mole): 100 parts by weight
    Triethylene glycol di-2-ethylhexanoate (3GO): 60 parts by weight
    An amount that is to be 0.2% by weight in the obtained first layer of "Tinuvin 326" (2-(2'-hydroxy-3'-t-butyl-5-methylphenyl)-5-chlorobenzotriazole) available from BASF Japan Ltd.
    An amount that is to be 0.2% by weight in the obtained first layer of BHT (2,6-di-t-butyl-p-cresol)

Preparation of Resin Composition for Forming Second Layer and Third Layer:
  The following ingredients were mixed, and kneaded sufficiently with a mixing roll to obtain a composition for forming a second layer and a third layer.
    Polyvinyl acetal resin (average polymerization degree: 1700, content of hydroxyl group: 30.5% by mole, acetylation degree: 1% by mole, acetalization degree: 68.5% by mole): 100 parts by weight
    Triethylene glycol di-2-ethylhexanoate (3GO): 38 parts by weight
    An amount that is to be 0.2% by weight in the obtained second layer and third layer of "Tinuvin 326" (2-(2'-hydroxy-3'-t-butyl-5-methylphenyl)-5-chlorobenzotriazole) available from BASF Japan Ltd.
    An amount that is to be 0.2% by weight in the obtained second layer and third layer of BHT (2,6-di-t-butyl-p-cresol)

Preparation of Resin Composition for Forming Colored Layer:
  The following ingredients were mixed, and kneaded sufficiently with a mixing roll to obtain a composition for forming a colored layer.
    Polyvinyl acetal resin (average polymerization degree: 1700, content of hydroxyl group: 30.5% by mole, acetylation degree: 1% by mole, acetalization degree: 68.5% by mole): 100 parts by weight
    Triethylene glycol di-2-ethylhexanoate (3GO): 40 parts by weight
    An amount that is to be 5.9% by weight in 100% by weight of the resin composition for forming a colored layer (in 100% by weight of the obtained colored layer) of calcium carbonate particles (inorganic particles, weight average particle diameter: 5.0 μm)

Preparation of Interlayer Film and Roll Body:
  The resin composition for forming a first layer, the resin composition for forming second and third layers, and the resin composition for forming a colored layer were coextruded by using a co-extruder to obtain an interlayer film before embossing. The obtained interlayer film before embossing was subjected to embossing by an emboss roll method with a linear pressure of 0.30 kN/cm to prepare an interlayer film. The obtained interlayer film was wound into a roll.

Preparation of Laminated Glass:
  The interlayer film was sandwiched between two sheets of clear glass conforming to JIS R3202:1996 having a thickness of 2 mm to obtain a laminate. The obtained laminate was put into a rubber bag and the inside thereof is degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass. The obtained laminated glass corresponds to the laminated glass X.

Examples 2 to 9 and Comparative Examples 1, 2

The interlayer film, the roll body and the laminated glass were produced in the same manner as in Example 1 except that the configuration of the interlayer film was changed to those shown in Tables 1, 2.

(Evaluation)
(1) Measurement of Parallel Light Transmittance

Using the obtained laminated glass, parallel light transmittance was measured by the method described above.

The obtained interlayer film had a colored region and a transparent region in this order from one end side to the other end side in the widthwise direction of the interlayer film.

(2) Maximum Value of Ten-Point Average Roughness Rz of Surface in Thickness Direction of Interlayer Film in Colored Region A ten-point average roughness Rz of surface in the thickness direction of the interlayer film in the colored region was measured by the method described above, and a maximum value of ten-point average roughness Rz was determined.

(3) Color Migration

The obtained roll body was left to stand in an environment of 16° C. for 24 hours or for 168 hours. The interlayer film was unwound from the roll body after standing. The surface of the interlayer film at a position of 20 m of the unwound interlayer film was visually checked by an inspector, and color migration was evaluated according to the following criteria.

[Criterial for Judgment in Color Migration]
- ○: color irregularity due to color migration not occur
- Δ: color irregularity due to color migration slightly occur (unproblematic in practical use)
- x: color irregularity due to color migration occur Configurations of interlayer films and results are shown in the following Tables 1, 2.

TABLE 1

|  |  | Comparative Example 1 | Comparative Example 2 | Example 1 | Example 2 | Example 3 | Example 4 |
|---|---|---|---|---|---|---|---|
| Average thickness (Y) of interlayer film in transparent region | μm | 780 | 780 | 780 | 785 | 797 | 824 |
| Average thickness (X) of interlayer film in colored region | μm | 780 | 800 | 770 | 765 | 767 | 770 |
| Absolute value of difference between average thickness (X) of interlayer film in colored region and average thickness (Y) of interlayer film in transparent region | μm | 0 | 20 | 10 | 20 | 30 | 54 |
| Shortest distance between surface in thickness direction of interlayer film and surface in thickness direction of colored layer | μm | 1 | 5 | 9 | 8 | 9 | 6 |
| Dimension of colored region in widthwise direction of interlayer film | mm | 120 | 150 | 127 | 150 | 150 | 250 |
| Maximum value of ten-point average roughness Rz of surface in thickness direction of interlayer film in colored region | μm | 8 | 7 | 40 | 29 | 30 | 10 |
| Color migration After standing for 24 hours |  | x | x | Δ | ○ | ○ | ○ |
| After standing for 168 hours |  | x | x | Δ | Δ | ○ | ○ |

TABLE 2

|  |  | Example 5 | Example 6 | Example 7 | Example 8 | Example 9 |
|---|---|---|---|---|---|---|
| Average thickness (Y) of interlayer film in transparent region | μm | 800 | 790 | 810 | 800 | 810 |
| Average thickness (X) of interlayer film in colored region | μm | 780 | 780 | 770 | 780 | 780 |
| Absolute value of difference between average thickness (X) of interlayer film in colored region and average thickness (Y) of interlayer film in transparent region | μm | 20 | 10 | 40 | 20 | 30 |
| Shortest distance between surface in thickness direction of interlayer film and surface in thickness direction of colored layer | μm | 24 | 80 | 5 | 8 | 38 |
| Dimension of colored region in widthwise direction of interlayer film | mm | 170 | 200 | 254 | 70 | 100 |
| Maximum value of ten-point average roughness Rz of surface in thickness direction of interlayer film in colored region | μm | 6 | 8 | 11 | 41 | 32 |
| Color migration After standing for 24 hours |  | ○ | ○ | ○ | ○ | ○ |
| After standing for 168 hours |  | ○ | ○ | ○ | ○ | ○ |

EXPLANATION OF SYMBOLS 1, 1A, 1B: First layer
2, 2B: Second layer
3, 3B: Third layer
4, 4A, 4B: Colored layer
11, 11A, 11B: Interlayer film
51: Roll body
61: Winding core
X: Colored region
Y: Transparent region

The invention claimed is:

1. An interlayer film for laminated glass, when the interlayer film being arranged between two sheets of clear glass conforming to JIS R3202: 1996 to obtain a laminated glass X, and parallel light transmittance being measured for the obtained laminated glass X, the interlayer film having a colored region with a parallel light transmittance of less than 60%, and a transparent region with a parallel light transmittance of 60% or more,
   the interlayer film having an average thickness in the colored region smaller than an average thickness in the transparent region, and
   the interlayer film having an absolute value of difference between the average thickness in the colored region and the average thickness in the transparent region of 10 μm or more.

2. The interlayer film for laminated glass according to claim 1, wherein
   the colored region has a colored layer with a parallel light transmittance of less than 60%, and
   a shortest distance between a surface in a thickness direction of the interlayer film and a surface in a thickness direction of the colored layer is 10 μm or more.

3. The interlayer film for laminated glass according to claim 1, wherein
   at least one of surfaces in a thickness direction of the interlayer film in the colored region has protrusions and recesses formed by an emboss roll method, and
   a maximum value of ten-point average roughness Rz of the surface having protrusions and recesses of the interlayer film in the colored region is 9 μm or more.

4. A laminated glass comprising:
   a first lamination glass member;
   a second lamination glass member; and
   the interlayer film for laminated glass according to claim 1,
   the interlayer film for laminated glass being arranged between the first lamination glass member and the second lamination glass member.

5. A laminated glass comprising:
   a first lamination glass member;
   a second lamination glass member; and
   an interlayer film for laminated glass,
   the interlayer film for laminated glass being arranged between the first lamination glass member and the second lamination glass member,
   when parallel light transmittance being measured for the laminated glass, the laminated glass having a colored region with a parallel light transmittance of less than 60%, and a transparent region with a parallel light transmittance of 60% or more,
   the interlayer film having an average thickness in the colored region smaller than an average thickness in the transparent region, and
   the interlayer film having an absolute value of difference between the average thickness in the colored region and the average thickness in the transparent region of 10 μm or more.

* * * * *